(12) United States Patent
Chang

(10) Patent No.: US 7,607,603 B1
(45) Date of Patent: Oct. 27, 2009

(54) SINGLE-PULL POWER AND SIGNAL CABLE REEL

(76) Inventor: Wen-Han Chang, 6 Fl., No. 3, Lane 68, San Min Rd., Taipei City (TW)

(*) Notice: Subject to any disclaimer, the term of this patent is extended or adjusted under 35 U.S.C. 154(b) by 0 days.

(21) Appl. No.: 12/125,073

(22) Filed: May 22, 2008

(51) Int. Cl.
*B65H 75/48* (2006.01)

(52) U.S. Cl. .............. 242/378.1; 242/378.2; 242/378.3; 242/378.4; 191/12.2 R; 191/13

(58) Field of Classification Search ............ 242/378, 242/378.1–378.4; 191/12.2 R, 13
See application file for complete search history.

(56) References Cited

U.S. PATENT DOCUMENTS

| 3,657,491 | A  | * | 4/1972 | Ryder et al. | 191/12.2 R |
| 3,854,017 | A  | * | 12/1974 | Crim | 191/12.2 R |
| 6,135,254 | A  | * | 10/2000 | Liao | 191/12.4 |
| 7,222,812 | B2 | * | 5/2007 | Chang et al. | 242/378.1 |
| 2002/0023814 | A1 | * | 2/2002 | Poutiatine | 191/12.2 R |
| 2006/0006038 | A1 | * | 1/2006 | Beverlin | 191/12.2 R |
| 2006/0102766 | A1 | * | 5/2006 | Chang et al. | 242/378.1 |
| 2007/0080943 | A1 | * | 4/2007 | Chang et al. | 345/163 |
| 2007/0086613 | A1 | * | 4/2007 | Chang et al. | 381/333 |
| 2009/0050727 | A1 | * | 2/2009 | Chang | 242/376 |

\* cited by examiner

*Primary Examiner*—Sang Kim
(74) *Attorney, Agent, or Firm*—Leong C. Lei

(57) ABSTRACT

A single-pull power and signal cable reel is disclosed. The reel provides single direction multi-stage retraction of signal and power cable. When the lead wire is pulled once, a positioning effect is provided. Accordingly, the reel allows precise control of an extended signal or cable for use in computer or related products.

2 Claims, 5 Drawing Sheets

SINGLE-PULL POWER AND SIGNAL CABLE REEL

BACKGROUND OF THE INVENTION (a) Technical Field of the Invention

The present invention relates to a reel for releasing or assembling of cable, in particular, to a single-pull, power and signal cable reel which could precisely control the length of the required cable used in PC or related products.

(b) Brief Description of the Prior Art

Conventional reels available in the market include reels employed steel beads as the positioning structure. A loop spring is mounted within the cable-rotating disc to provide the power to restore or retract the lead wire. The positioning structure employs the beads to slidably position the lead wire. In order to allow the positioning by the beads, the bottom section of the cable-rotating disc is provided with mechanical rail, allowing the beads to roll in the rail so as to provide engagement or disengagement.

This type of positioning structure is generally for use in small size reel, and it is employed in smaller size signal transmission cable. This type of reel cannot be used in common type of power cable. Further, under the requirement of a single-pull action on the lead wire, the reel for such cable is not practical and can never be achieved. The drawbacks of the conventional reels are as follows:

(1) The beads need to be within the rail in order to provide engagement and disengagement, and therefore, the engagement and disengagement of beads with the rail will cause the gap of the rail to increase. Subsequently, when the gap is enlarged, the bead may be dislocated, and the reel is not functioning efficiently.

(2) The large gap of the rail will cause noise. Thus, the quality of the reel is poor after a period of application.

(3) When the gap of the rail has been enlarged due to long period of application, besides the noise and the engagement problem of the reel, the operation of the reel will not be reliable.

(4) In this type of reel, the end terminal of the lead must have a spare wire to allow the lead being pulled without affecting the power connection end. The extra length of the spare wire increases the cost of production of the reel. Further, the spare wire may entangle in the course of retraction. Thus, the operation of the conventional reel is not efficient.

Accordingly, it is an object of the present invention to provide a single-pull power and signal cable reel which mitigates the drawbacks mentioned above.

SUMMARY OF THE INVENTION

It is accordingly an object of the present invention to provide a single pull power and signal cable reel comprising a positive and negative lead extension plate, a top cap, a forward direction conductor assembly, an engaging element, a cable-rotating disc, a backward direction conductor assembly, a loop spring, a lead wire, a lower cap and a positioning rod structure mounted within the lower cap, characterized in that the lead wire is wound on the disc surface of the cable-rotating disc and the ends of the lead wire are inserted to the engaging member mounted within the center seat of the cable reel and are respectively soldered to the conductors of the positive and negative conductor assembly, forming into the rotating disc for the loop spring to rotate within the disc; the center end of the loop spring is secured to the center seat and the outer end of the loop spring is mounted to the engaging slot at the inner edge of the lower cap by a hook such that the loop spring can rotate clockwise or anti-clockwise of the cable-rotating disc to form either a tightening or a releasing state to provide a power source to retract of the lead wire for the cable-rotating disc; the forward and backward conductor assembly are formed from a spring member and a conductor member and are assembled within the center seat and the center hole of the engaging member corresponding to the center seat, the spring member is located at a lower position and the conductor member is located at an upper position, such that the force of the spring member urges the conductor member, thereby the positive and negative terminal lead extension plates corresponding to the forward and backward direction conductor member are constantly in contact.

Yet still a further object of the present invention to provide a single-pull power and signal cable reel, wherein the positioning rod structure is mounted at the external side of the inner edge of the lower cap so as to correspond to the railing slot provided at the bottom section of the cable-rotating disc, the structure is characterized in that it comprises a positioning rod and a positioning plate and the positioning plate covers the upper section of the positioning rod and is locked using a peg and a pivotal hole at the center of the positioning plate is used for pivotal mounting of the positioning rod, and the front end of the positioning rod exposed by the positioning plate is provided with a slidable protruded section corresponding to the railing slot which rotates in accordance with the railing slot of the rotating disc to perform a sequential engaging and disengaging operation.

Other objects, and advantages will become more apparent in view of the following detailed description in conjunction with the accompanying drawings.

DETAILED DESCRIPTION OF THE PREFERRED EMBODIMENT

Figure 1:
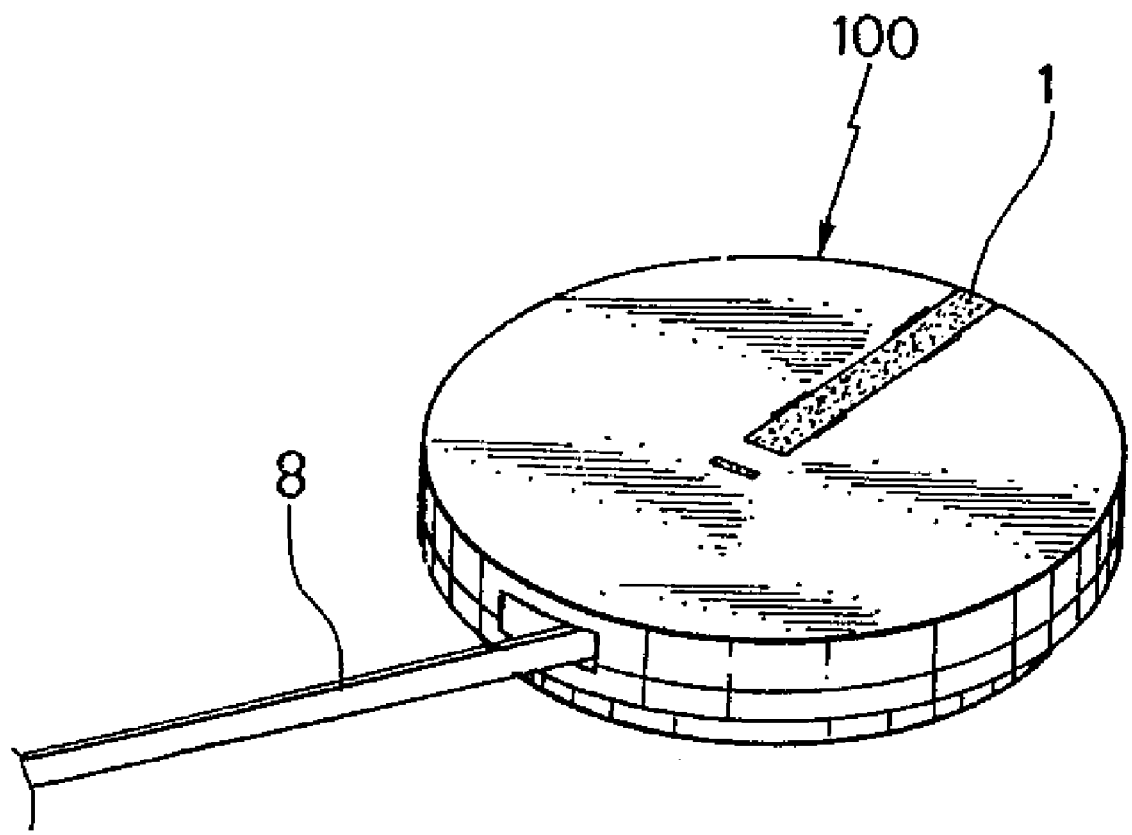
FIG. 1 is a perspective view of the preferred embodiment of the present invention.
Figure 2:
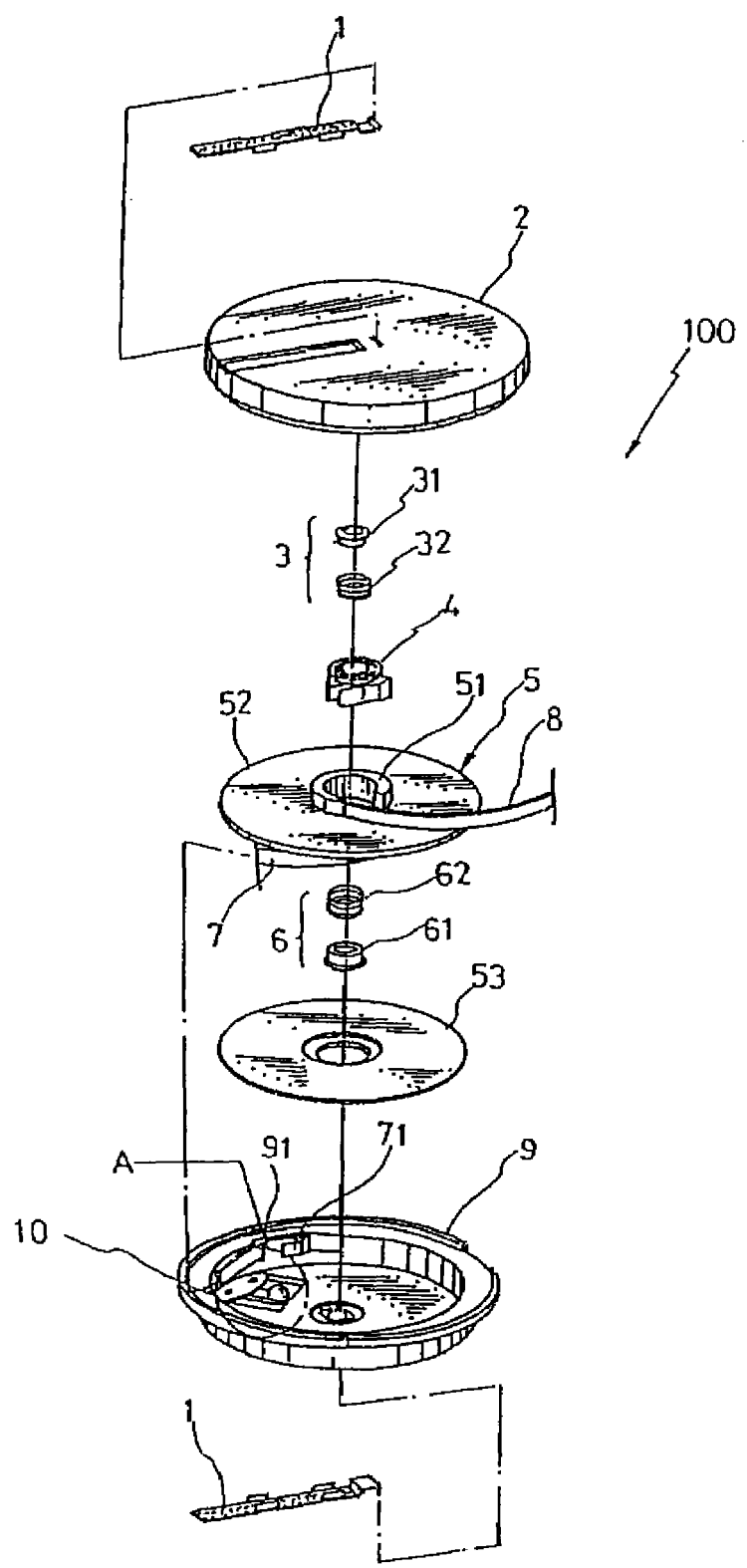
FIG. 2 is a perspective exploded view showing various components in accordance with the present invention.

Referring to FIGS. 1 and 2, there is shown a single-pull power and signal cable reel of the present invention. The reel comprises a positive and negative terminal conductor extension plate 1, a top cap 2, a forward direction conductor assembly 3, an engaging member 4, a cable-rotating disc 5, a backward direction conductor assembly 6, a loop-spring 7, a lead wire 8, a bottom cap 9 and a positioning rod structure 10 mounted within the bottom cap. In the present invention, the surface of the top and bottom cap 2, 9 is provided with slot for the holding and positioning of the positive and negative terminal conductor extension plate 1. Any object to be connected can be easily linked to the conductive extension plate 1 to provide power linkage or signal transmission connection. The center end of the loop spring is engaged with the mounting seat 51 positioned at the center of the cable-rotating disc 5, and the external end of the loop spring is engaged with the engaging slot 91 at the inner edge of the bottom cap 9 by an edge hook 71 such that the loop spring 7 can rotate clockwise or anti-clockwise in accordance with the cable-rotating disc 5 so that the loop spring 7 forms into either a tightening or releasing state to provide power to retract or restore for the reel.

Figure 3:
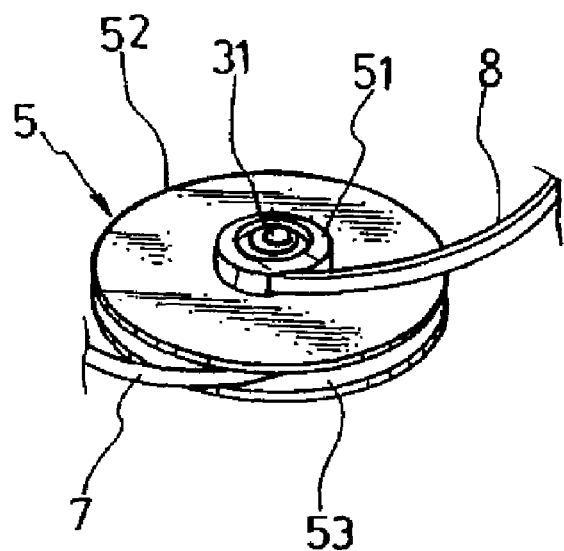
FIG. 3 is a perspective view showing the cable-rotating disc of the present invention.

As shown in FIG. 3, the cable-rotating disc 5 comprises a top disc 52 and a bottom disc 53. The upper and lower section of the top disc 52 is a mounting seat 51 and the interior of the mounting seat 51 is an engaging member 4. The lead wire 8 is wound the surface of the disc 52 and the loop spring 7 surrounds between the gap of the top disc 52 and the bottom disc 53 such that the rotating-cable disc 5 is hold by the space provided by the bottom cap 9 so as to correspond to the positioning rod structure 10 at the bottom cap 9.

The center mounting seat 51 of the cable-rotating disc 5 is disposed with an engaging member 4. The engaging member 4 is used to secure the terminal ends of the lead wire 8 and to connect the positive and negative terminal of the lead wire 8 to the positive and negative terminal of the conductor members 31, 61 so as to form the connection point of signal or power source for the reel 100. At the same time, the positive and negative conductive extension plate 1 at the outer side of the reel 100 allows the power source or signal cable to be extended out.

Figure 7:
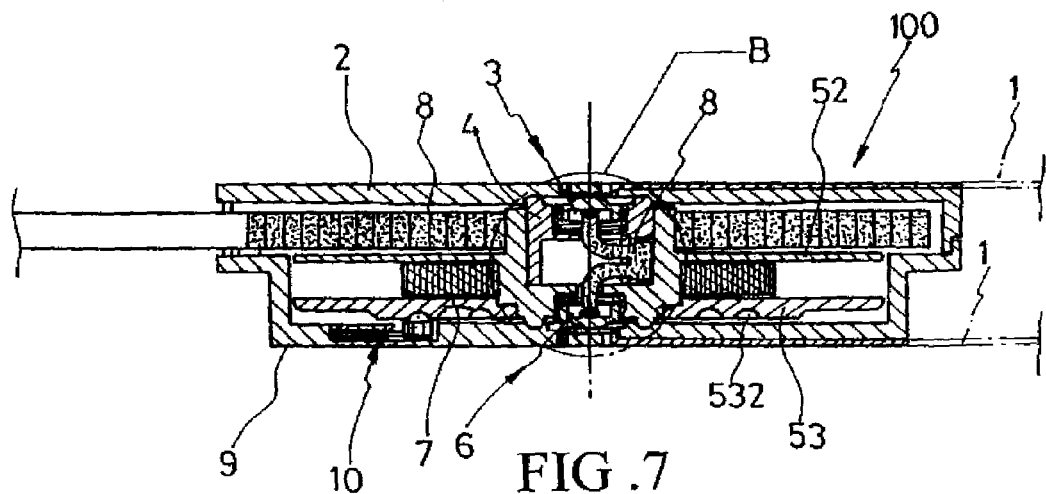
FIG. 7 is a sectional view of the cable reel of the present invention.
Figure 8:
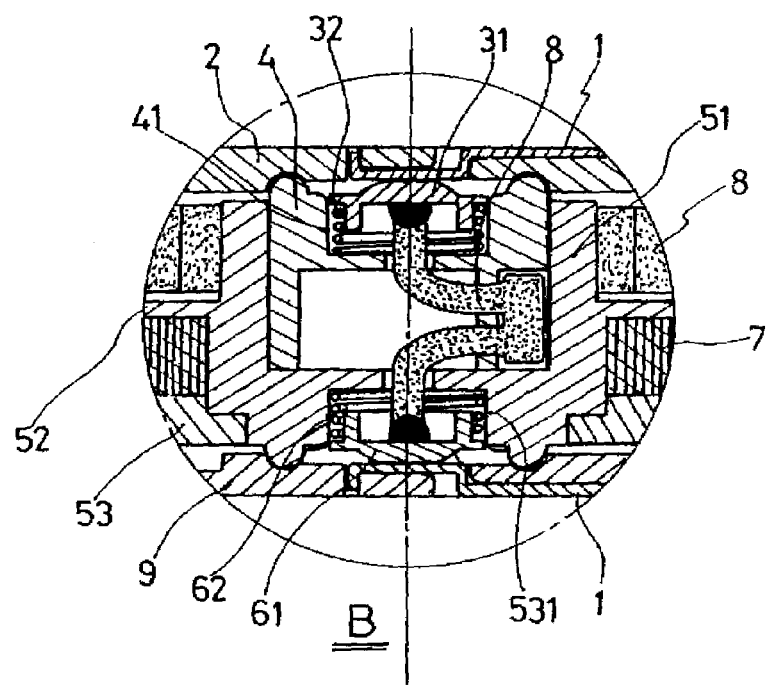
FIG. 8 is an enlarged view along line B-B of FIG. 7 of the present invention.

As shown in FIGS. 7 and 8, the engaging member 4 corresponding to the center mounting seat 51 is provided with a corresponding center holes 41, 531. The interior of the center holes 41, 531 is respectively provided with a forward direction conductor assembly 3 and a backward direction conductor assembly 6 to respectively connect by soldered with the positive and negative conductor members 31, 61. The conductor assembly (positive or negative) 3, 6 comprises springs 32, 62 and conductors 31, 61, and the spring members 32, 62 located below the conductor members 31, 61 are constantly contact with conductor members 31, 61 such that the conductor members 31, 61 are exactly corresponding to the external side conductor extension plate 1, forming into a constant connection. Thus when the lead wire 8 is pulled or retracted, the cable-rotating disc 5 at the interior thereof is triggered to rotate, and the conductor members 31, 61 and the conductive extension plate 1 maintain in contact without affecting the lead wire 8 from extending outward. Thus, the present invention provides a single-pull action to achieve signal or power transmission.

Figure 5:
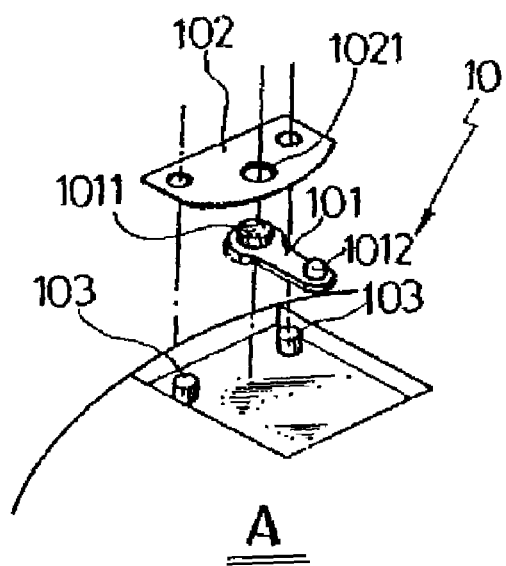
FIG. 5 is a perspective exploded view of the positioning rod in accordance with the present invention.
Figure 6:
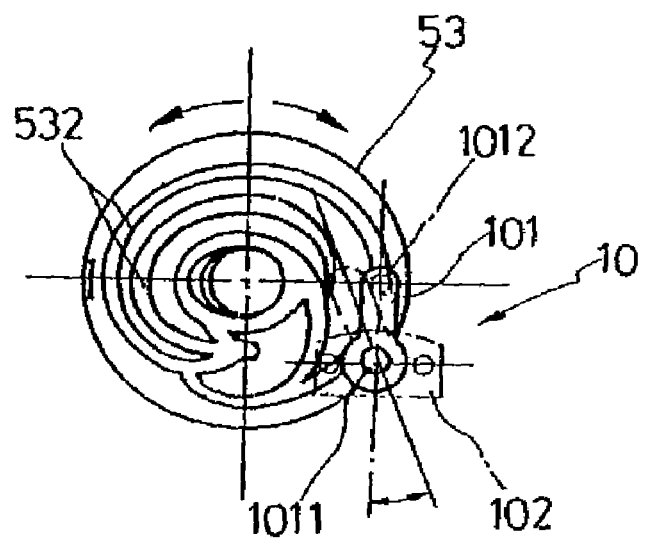
FIG. 6 is a schematic view showing the relative position of the positioning rod structure and the railing slot in accordance with the present invention.

Referring to FIGS. 2, 5 and 6, the cable-rotating disc 5 is positioned at the positioning structure at the inner edge of the bottom cap 9 to provide a mutual engaging or disengaging action. The positioning structure 10 comprises a positioning rod 101 and a positioning plate 102. The positioning plate 102 covers the top portion of the positioning rod 101 and the two lateral sides of the positioning plate 102 are locked with a peg 103. The positioning plate 102 is pivotally disposed at the positioning rod pivotal shaft 1011 by way of the pivotal hole 1021 at the center of the positioning plate 102 such that the positioning rod 101 forms a pivotal structure with the positioning plate 102. Further, the front end of the shaft body exposed by the positioning plate 102 is provided with a slidable protruded section 1012 corresponding to the railing slot 532 at the bottom section of the bottom disc 53.

Figure 4:
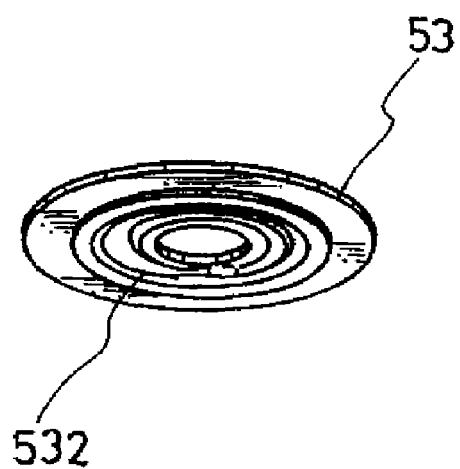
FIG. 4 is a perspective view showing the lower disc of the cable-rotating disc of the present invention.

As shown in FIGS. 4 and 6, the bottom section of the cable-rotating disc 5 is provided with an operation railing slot 532 and the positioning rod 101 rotates in accordance with the railing slot so as to produce an engaging and a disengaging operation. Thus, when the lead wire 8 is pulled, the cable-rotating disc 5 is rotated and the positioning rod 101 together with the railing slot 532 swings. Such swinging moment is based on the positioning of the extension of the lead wire 8, another pulling of the lead wire 8 will allow the positioning rod 101 to disengage. Another sequential positioning mechanism is that when the lead wire 8 is pulled and positioned, before the lead wire 8 is fully retracted, the pulling of the lead wire 8 will cause the positioning rod 101 to re-engage.

Thus, in accordance with the present invention, there are two mode of controlling the retraction of lead wire from the reel. While the invention has been described with respect to preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

The invention claimed is:

1. A single pull power and signal cable reel comprising a positive and negative lead extension plate, a top cap, a forward direction conductor assembly, an engaging element, a cable-rotating disc, a backward direction conductor assembly, a loop spring, a lead wire, a lower cap and a positioning rod structure mounted within the lower cap, characterized in that the lead wire is wound on the disc surface of the cable-rotating disc and the ends of the lead wire are inserted to the engaging member mounted within the center seat of the cable reel and are respectively soldered to the conductors of the positive and negative conductor assembly, forming into the rotating disc for the loop spring to rotate within the disc; the center end of the loop spring is secured to a center seat and the outer end of the loop spring is mounted to an engaging slot at the inner edge of the lower cap by a hook such that the loop spring can rotate clockwise or anti-clockwise of the cable-rotating disc to form either a tightening or a releasing state to provide a power source to retract of the lead wire for the cable-rotating disc;

each of the forward and backward conductor assembly is formed from a spring member and a conductor member and is assembled within the center seat and the center hole of the engaging member corresponding to the center seat, each of the spring member is located at a lower position and each of the conductor member is located at an upper position, such that the force of each of the spring member urges each of the conductor member respectively, thereby the positive and negative terminal lead extension plates corresponding to the forward and backward direction conductor member are constantly in contact.

2. The single-pull power and signal cable reel of claim 1, wherein the positioning rod structure is mounted at the external side of the inner edge of the lower cap so as to correspond to a railing slot provided at a bottom section of the cable-rotating disc, the structure is characterized in that it comprises a positioning rod and a positioning plate and the positioning plate covers the upper section of the positioning rod and is locked using a peg and a pivotal hole at the center of the positioning plate is used for pivotal mounting of the positioning rod, and the front end of the positioning rod exposed by the positioning plate is provided with a slidable protruded section corresponding to the railing slot which rotates in accordance with the railing slot of the rotating disc to perform a sequential engaging and disengaging operation.

* * * * *